(12) United States Patent
Elliott

(10) Patent No.: US 6,859,135 B1
(45) Date of Patent: Feb. 22, 2005

(54) SYSTEM AND METHOD FOR CONSERVING ENERGY IN WIRELESS DEVICES

(76) Inventor: Brig Barnum Elliott, 25 Wollaston Ave., Arlington, MA (US) 02476

( * ) Notice: Subject to any disclaimer, the term of this patent is extended or adjusted under 35 U.S.C. 154(b) by 715 days.

(21) Appl. No.: 09/586,876

(22) Filed: Jun. 5, 2000

(51) Int. Cl.[7] .......................... G08B 5/22; H04Q 1/30; H04Q 7/00
(52) U.S. Cl. ..................................... 340/7.36; 340/7.32
(58) Field of Search ............................ 340/7.22, 7.29, 340/7.32, 7.33, 7.37, 7.38, 10.34, 10.33, 825.44–825.48, 825.54; 455/574, 343, 522, 426.1, 567, 33, 551

(56) References Cited

U.S. PATENT DOCUMENTS

| | | | | |
|---|---|---|---|---|
| 4,398,192 A | * | 8/1983 | Moore et al. | 340/825.44 |
| 5,361,397 A | * | 11/1994 | Wright | 455/38.2 |
| 5,566,357 A | | 10/1996 | Holcman | 455/54.1 |
| 5,590,396 A | * | 12/1996 | Henry | 455/33.1 |
| 5,710,975 A | * | 1/1998 | Bernhardt et al. | 455/38.3 |
| 5,740,366 A | * | 4/1998 | Mahany et al. | 395/20.12 |
| 5,778,309 A | * | 7/1998 | Tuttle et al. | 455/127 |
| 5,842,141 A | * | 11/1998 | Vaihoja et al. | 455/574 |
| 6,088,600 A | * | 7/2000 | Rasmussen | 455/574 |
| 6,112,055 A | * | 8/2000 | Bennett et al. | 455/38.3 |
| 6,157,816 A | * | 12/2000 | Anderson et al. | 455/38.3 |
| 6,289,228 B1 | * | 9/2001 | Rotstein et al. | 455/574 |

* cited by examiner

*Primary Examiner*—Michael Horabik
*Assistant Examiner*—Nam Nguyen
(74) *Attorney, Agent, or Firm*—Ropes & Gray LLP

(57) ABSTRACT

A device conserves energy while engaging in wireless data communications. The device determines (705) whether it has ceased data communication for a first period of time. The device then selectively powers down (725) components in the device when the device has ceased communication for the first period of time.

15 Claims, 13 Drawing Sheets

SYSTEM AND METHOD FOR CONSERVING ENERGY IN WIRELESS DEVICES

FIELD OF THE INVENTION

The present invention relates generally to wireless data communications devices and, more particularly, to a system and method for conserving energy in wireless data communications devices.

BACKGROUND OF THE INVENTION

Conventional wireless telecommunications devices advantageously permit communication between a sending source and a receiving destination, without requiring a physical connection to a traditional Public Switched Telephone Network (PSTN). Thus, instead of being restricted to a location that maintains a PSTN land-line connection, conventional wireless telecommunications devices advantageously permit device users to geographically "roam" while communicating with a destination device. This capacity to "roam" has been of great benefit in telecommunications applications.

The benefits of wireless communication have more recently been recognized in the area of data communications. The ability of a portable computing device, such as a lap-top computer for example, to achieve data communication with another computing device (e.g., a host or server) using a wireless connection is highly desirable. A wireless data connection permits a wireless data communications device, such as a lap-top computer, to send and receive data while roaming from one geographic location to another, without the necessity of maintaining a land-line connection with a PSTN.

Wireless data communication while roaming, however, necessitates some sort of portable power source for the roaming data communications device. Wireless data communications devices have, therefore, typically used battery power sources. Wireless data communications devices, however, are high energy consumers and, therefore, require that their associated battery power sources be replaced or recharged very often.

Therefore, there exists a need for a system and method that reduces the energy consumption of a wireless data communications device.

SUMMARY OF THE INVENTION

Systems and methods consistent with the present invention address this need by providing mechanisms to selectively power down components of wireless data communications devices for purposes of conserving energy, while enabling the devices to power back up when necessary to receive or transmit data. In particular, systems and methods consistent with the present invention include mechanisms that enable a wireless data communications device to enter "nap" or "sleep" states, in which energy to selected device sub-components is turned off, as a function of the device's data communication activity.

In accordance with the purpose of the invention as embodied and broadly described herein, a method of conserving energy in a wireless data communications device includes determining whether the wireless data communications device has ceased communication for a first period of time. If the device has ceased communication for the first period of time, the device selectively powers down components in the device.

In another implementation consistent with the present invention, a method of powering up components in a wireless data communications device includes receiving a paging message at the device from a paging network, the device having components in a powered down state and the paging message instructing the device to power up components of the device. In response to the received paging message, components of the device are powered up.

In a further implementation consistent with the present invention, a method of receiving a network address at a wireless device includes determining if the device has been in a powered down state for a first time period. The method additionally includes registering with a first network if the device has been in a powered down state for the first time period. The method further includes receiving a network address associated with the device from the first network in response to the registration.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods, consistent with the present invention, permit selective powering down of wireless data communications devices for purposes of conserving energy, while enabling the devices to power back up when necessary to receive or transmit data. In particular, systems and methods consistent with the present invention permit a wireless data communications device to go into "nap" or "sleep" states in which energy to selected device sub-components is turned off. "Nap" and "sleep" states are initiated in the wireless data communications device as a function of the data transfer activity between the device and an external network.

Exemplary System

Figure 1:
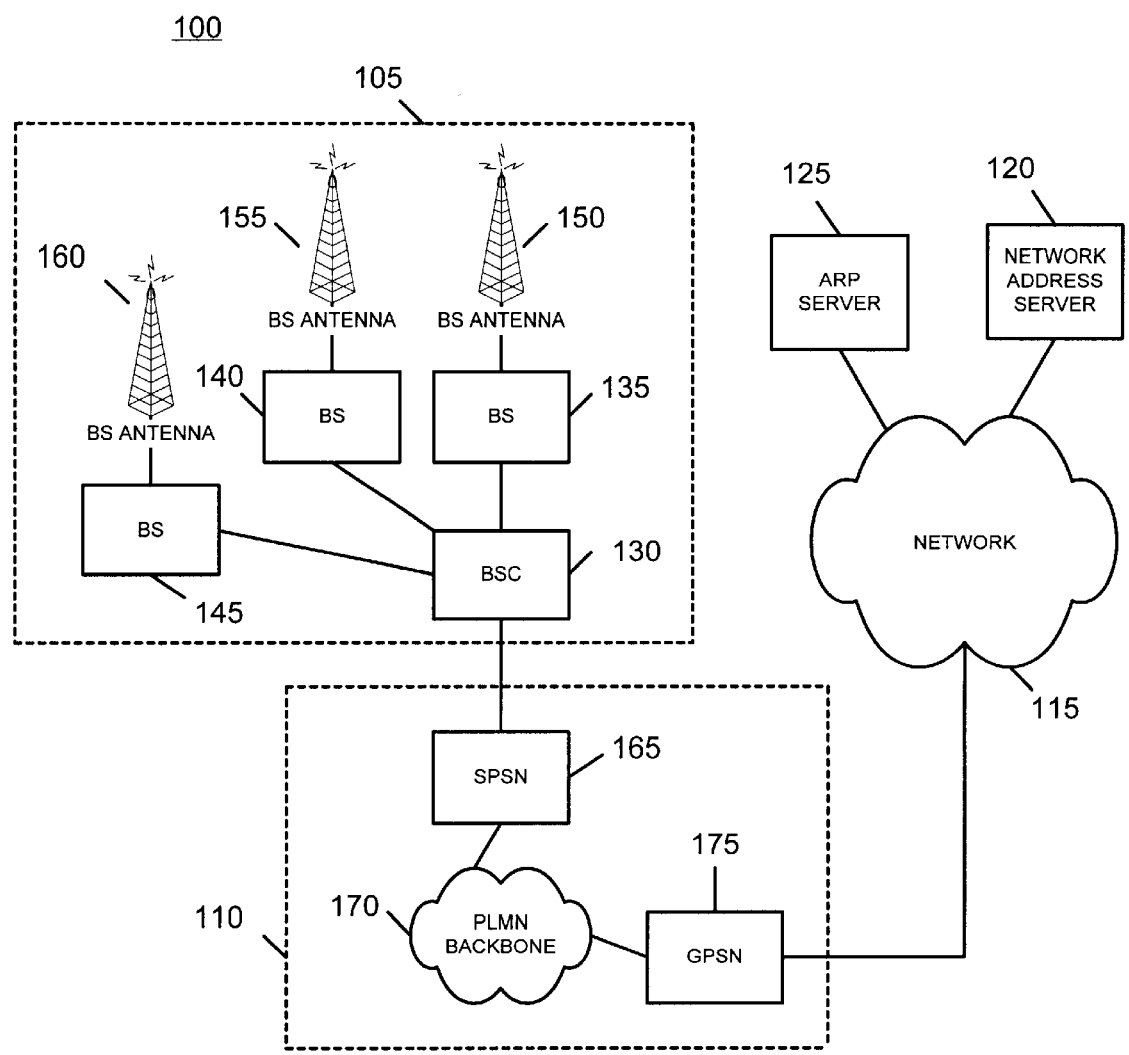
FIG. 1 illustrates an exemplary system consistent with the present invention.

FIG. 1 is a diagram of an exemplary system 100 in which a wireless data communications device may operate. System 100 includes a cellular network portion 105, a network local access portion 110, a network 115, a network address server 120, and an Address Resolution Protocol (ARP) server 125. Cellular network portion 105 can include a base station controller (BSC) 130, base stations 135, 140, and 145, and base station antennas 150, 155, and 160.

Cellular network portion 105 consists of components conventionally used for transmitting data to and from a wireless data communication device (not shown). Such components may include base station antennas 150, 155, and 160, which transmit and receive, via appropriate data channels, data from wireless data communication devices within their vicinity. Base stations 135, 140, and 145 connect to antennas 150, 155, and 160, and format the data transmitted to or received from the antennas in accordance with conventional techniques for transmission to a base station controller 130 or a wireless data communication device. Among other functions, base station controller 130 may route the received data to SPSN 165 in the network local access portion 110.

Network local access portion 110 consists of components conventionally used for facilitating communication between cellular network portion 105 and network 115. Network local access portion 110 can include a serving packet switching node (SPSN) 165, a public land mobile network (PLMN) backbone 170, and a gateway packet switching node (GPSN) 175. SPSN 165 receives wireless data communication device data routed from base station controller 130 and encapsulates and tunnels the encapsulated data to GPSN 175, via PLMN backbone 170, in accordance with conventional techniques. GPSN 175, using conventional protocols, forwards the encapsulated data to network 115.

Forwarding of the encapsulated data from GPSN 175 to an intended destination node in network 115 requires the retrieval of a network address associated with the intended destination node from network address server 120. Conversely, for data to be sent from a source node through GPSN 175 to a destination wireless data communications device, a temporary network address for the wireless data communications device may be retrieved from the network address server 120. Additionally, a subnet-level address associated with the retrieved network address may be retrieved from ARP server 125. The network and subnet-level addresses retrieved from network address server 120 and ARP server 125, respectively, permits data sent from, or intended for, a wireless data communications device to be routed to and from network 115. Network 115 can include any type of network, including a local area network (LAN), a metropolitan area network (MAN), a wide area network, (WAN), Intranet, or Internet.

Exemplary Network Address Server

Figure 2:
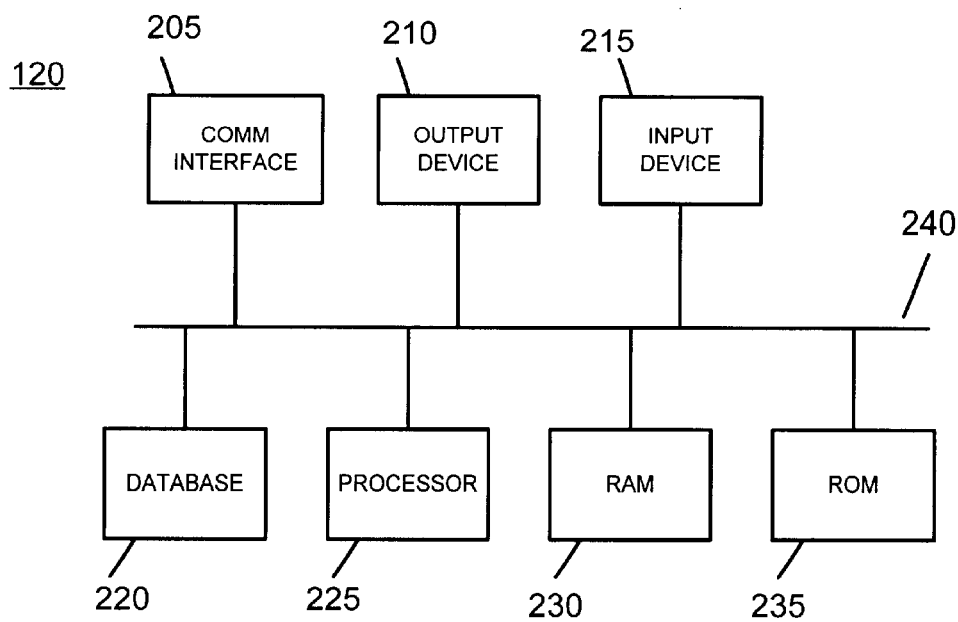
FIG. 2 illustrates exemplary components of a network address server consistent with the present invention.

FIG. 2 illustrates components of an exemplary network address server 120, consistent with the present invention. Network address server 120 may include a communication interface 205, an output device 210, an input device 215, a database 220, a processor 225, Random Access Memory (RAM) 230, Read Only Memory (ROM) 235, and a bus 240.

Communication interface 205 connects server 120 to network 115. Input device 215 permits entry of data into server 120 and output device 210 permits the output of data in video, audio, or hard copy format.

Processor 225 performs all data processing functions for inputting, outputting, and processing of recipient address data. RAM 230 provides temporary working storage of server data and instructions for use by processor 225. ROM 235 provides permanent or semi-permanent storage of data and instructions for use by processor 225. Bus 240 interconnects the various components of server 120 and allows the components to communicate with one another. Database 220 maintains address information associated with nodes that communicate with network 115 and may include a large-capacity storage device, such as a magnetic or optical recording medium and its corresponding drive.

Figure 3:
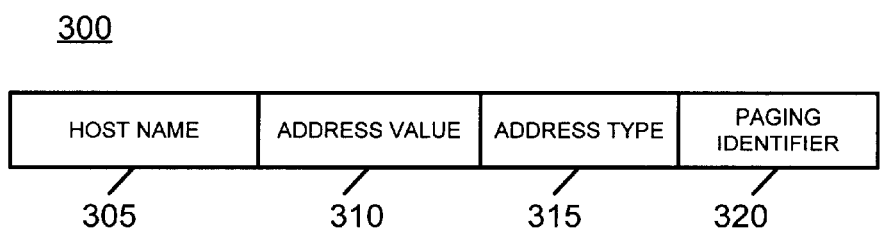
FIG. 3 illustrates an exemplary network address record stored in memory of the network address server of FIG. 2.

FIG. 3 illustrates an exemplary address record 300, consistent with the present invention, stored within database 220 of network address server 120. Address record 300 may consist of a host name 305, an address value 310, an address type 315, and a paging system identifier 325. Host name 305 can specify a unique name associated with a given host (e.g., a wireless communication device) within network 115. For example, if network 115 includes the Internet, then host name 305 might be a hierarchical domain name from the Internet's domain name system. Address value 310 can specify a network address, associated with the given host, in network 115. Address type 315 can specify how address value 310 should be interpreted by server 120. For example, if address value 310 contains the value 128.128.196.132 and address type 315 contains a value indicating an IP address, then server 120 would recognize that the domain name contained in host name 305 is located at the IP address contained in address value 310. Paging identifier (PI) 320 may contain data identifying the host associated with host name 305 for purposes of sending special paging messages (described below).

Exemplary Wireless Device

Figure 4:
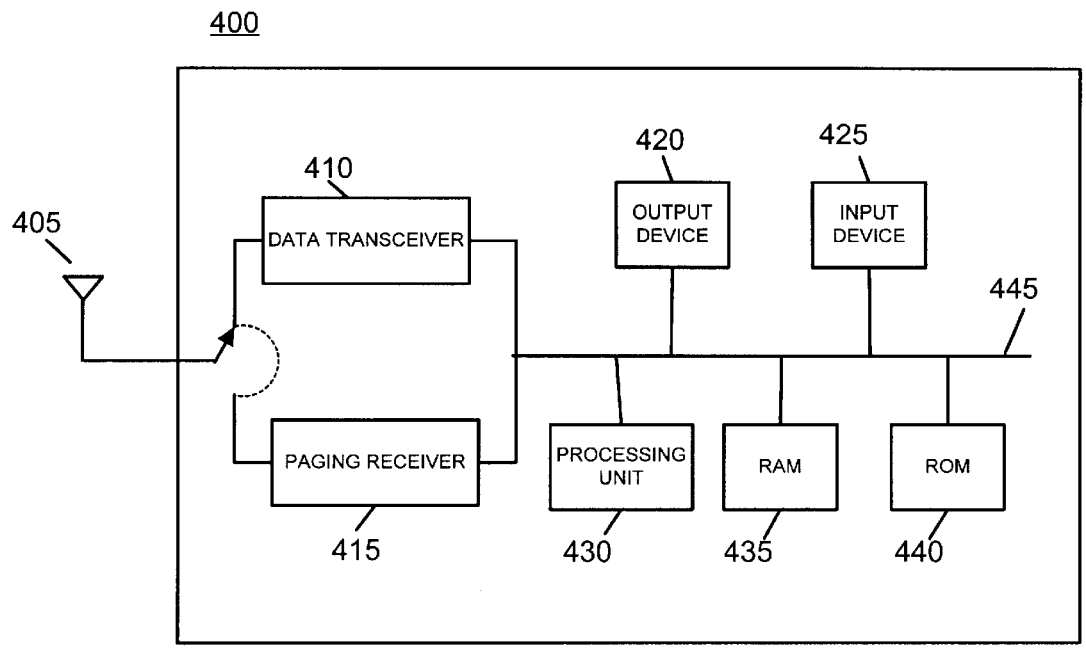
FIG. 4 illustrates an exemplary wireless data communications device in which methods, consistent with the present invention, may be implemented.

FIG. 4 illustrates an exemplary wireless data communications device 400 in which a method, consistent with the present invention, may be implemented to conserve energy in the device. Exemplary wireless device 400 may comprise a cellular phone, a personal or portable computer, a personal digital assistant (PDA) or the like. Wireless device 400 includes an antenna 405, a data transceiver 410, a paging receiver 415, an output device 420, an input device 425, a processing unit 430, RAM 435, ROM 440, and a bus 445. Antenna 405 may include a conventional antenna that facilitates reception and transmission of data packets by data transceiver 410. Antenna 405 further facilitates reception of paging messages by paging receiver 415.

Data transceiver 410 may include transceiver circuitry well known to one skilled in the art that can be tuned to multiple channels reserved for transmitting data in a wireless network (i.e., a channel can be a frequency, code, or time division of a physical radio frequency). Paging receiver 415 may include receiver circuitry well known to one skilled in the art that can be tuned to one or more paging channels.

Input device 425 permits entry of data into wireless device 400 and output device 420 permits the output of data in video, audio, or hard copy format. Processing unit 430 performs all data processing functions for inputting, outputting, and processing of data. RAM 435 provides temporary working storage of node data and instructions for use by processing unit 430. ROM 440 provides permanent or semi-permanent storage of data and instructions for use by processing unit 430. RAM 435 and ROM 440 may include large-capacity storage devices, such as a magnetic and/or optical recording medium and its corresponding drive. Bus 445 interconnects the various components of the device 400 to permit the components to communicate with one another.

Exemplary Energy Conservation Cycle

Figure 5:
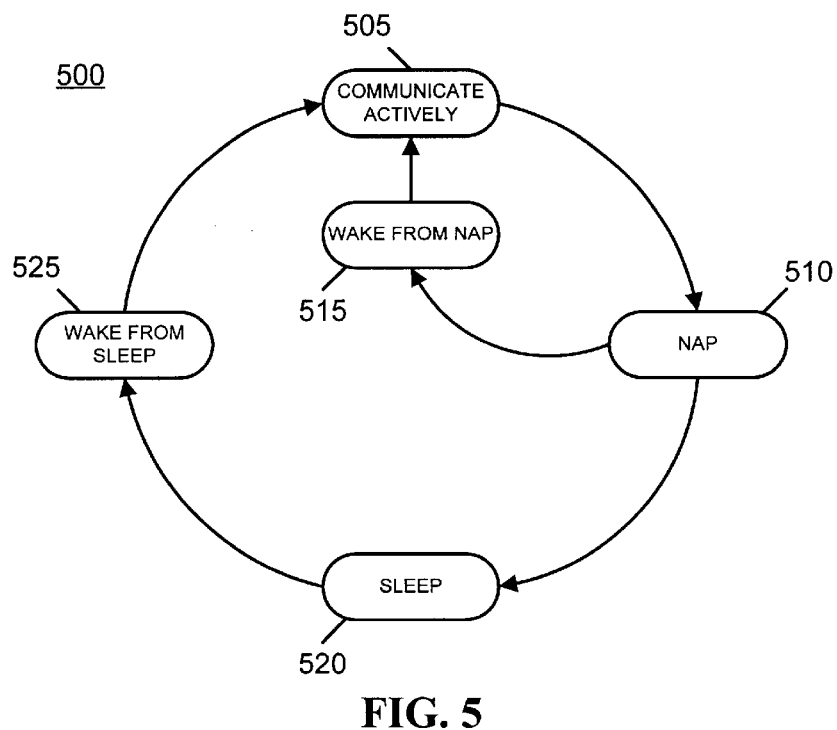
FIG. 5 illustrates an exemplary energy conservation cycle consistent with the present invention.

FIG. 5 illustrates a state diagram of an energy conservation cycle consistent with the present invention, in which network components cooperate to enable device 400 to power down when not engaged in data communications and to power back up when necessary to transmit or receive data. Device 400 begins in a first state in which it actively communicates (505) with network 115. From this state, if device 400 ceases active data communication with network 115 for a first configurable period of time, the device 400 initiates a "nap" state in which selected device components, such as data transceiver 410 or processing unit 430, are powered down to conserve energy (510). Paging receiver 415 of device 400 may remain, however, in a powered up condition.

From the "nap" state, device 400 can enter two states, either a "wake from nap" state (515) or a "sleep" state (520). If device 400 receives data intended for a napping wireless device, device 400 enters a "wake from nap" state (515) and powers up the appropriate components using "wake-up" signals. If device 400 does not receive data intended for a "napping" device for a second configurable period of time, device 400 enters a "sleep" state (520) and relinquishes network resources, including a network address, that have been dedicated to the "napping" device.

From the "sleep" state (520), device 400 enters a "wake from sleep" state (525) and powers up the appropriate components using "wake-up" signals when the device 400 receives data intended for a "sleeping" device. In the "wake from sleep" state (525), device 400 secures network resources, including a network address, to enable a data source to send data to device 400 via network 115, or vice-versa.

Exemplary Network Including Paging System

During "nap" (510) and "sleep" (520) states, wireless data communications device 400 places its data transceiver 410 in a powered down state. Therefore, in order for device 400 to receive data from a source, device 400 must first power up its data transceiver 410. To power up transceiver 410, "wake-up" signals can be transmitted for reception by device 400's paging receiver 415. In one exemplary embodiment, a paging system separate from cellular network portion 105, network local access portion 110, or network 115 supplies these signals. One skilled in the art will recognize, however, that local access portion 110 or network 115 could alternatively supply the "wake-up" signals to cellular network portion 105 for transmission to device 400.

Figure 6:
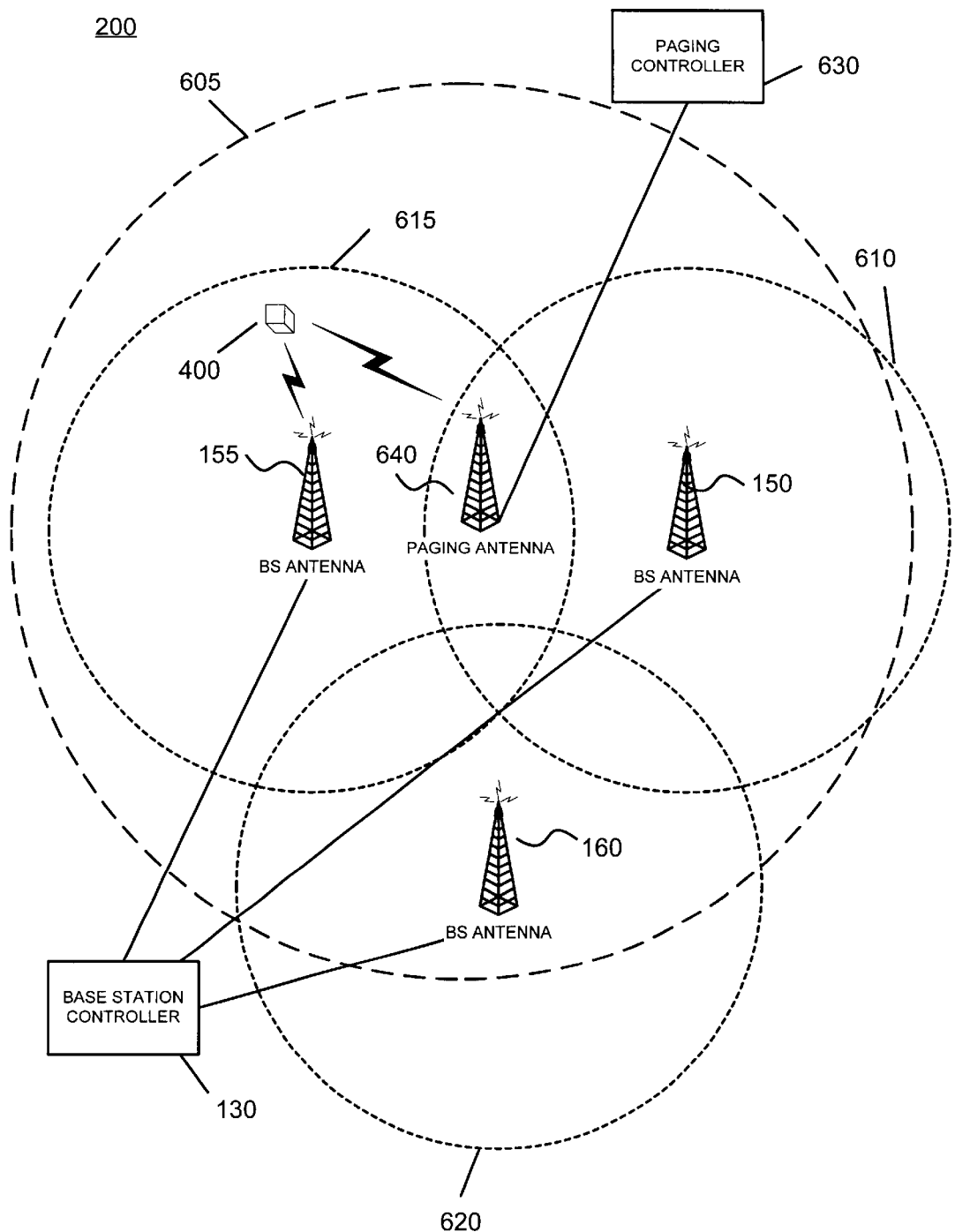
FIG. 6 illustrates an exemplary system including a paging system consistent with the present invention.

FIG. 6 illustrates a portion of exemplary system 100 that shows components of cellular network portion 105 and an additional paging system (not illustrated in FIG. 1). As described above with respect to FIG. 1, cellular network portion 105 of system 100 includes a base station controller 130 connected to base station antennas 150, 155 and 160 via respective base stations (not shown). Radio ranges, associated with each base station antenna 150, 155, and 160, are depicted by dotted lines 610, 615, and 620, respectively. The paging portion of system 100 includes a paging controller 630 and one or more paging antennas 640. The radio range associated with paging antenna 640 is depicted by dotted line 605.

As wireless data communications device 400 traverses system 100 in a "nap" or "sleep" state, paging controller 630 can initiate a "wake-up" paging signal, using paging identifier 320 that can be received by device 400 via paging receiver 415. Unlike the remaining components of device 400, paging receiver 415 remains in a powered up state during "nap" or "sleep" states and, therefore, can receive the "wake-up" signal.

Exemplary "Nap" System Processing

Figure 7:
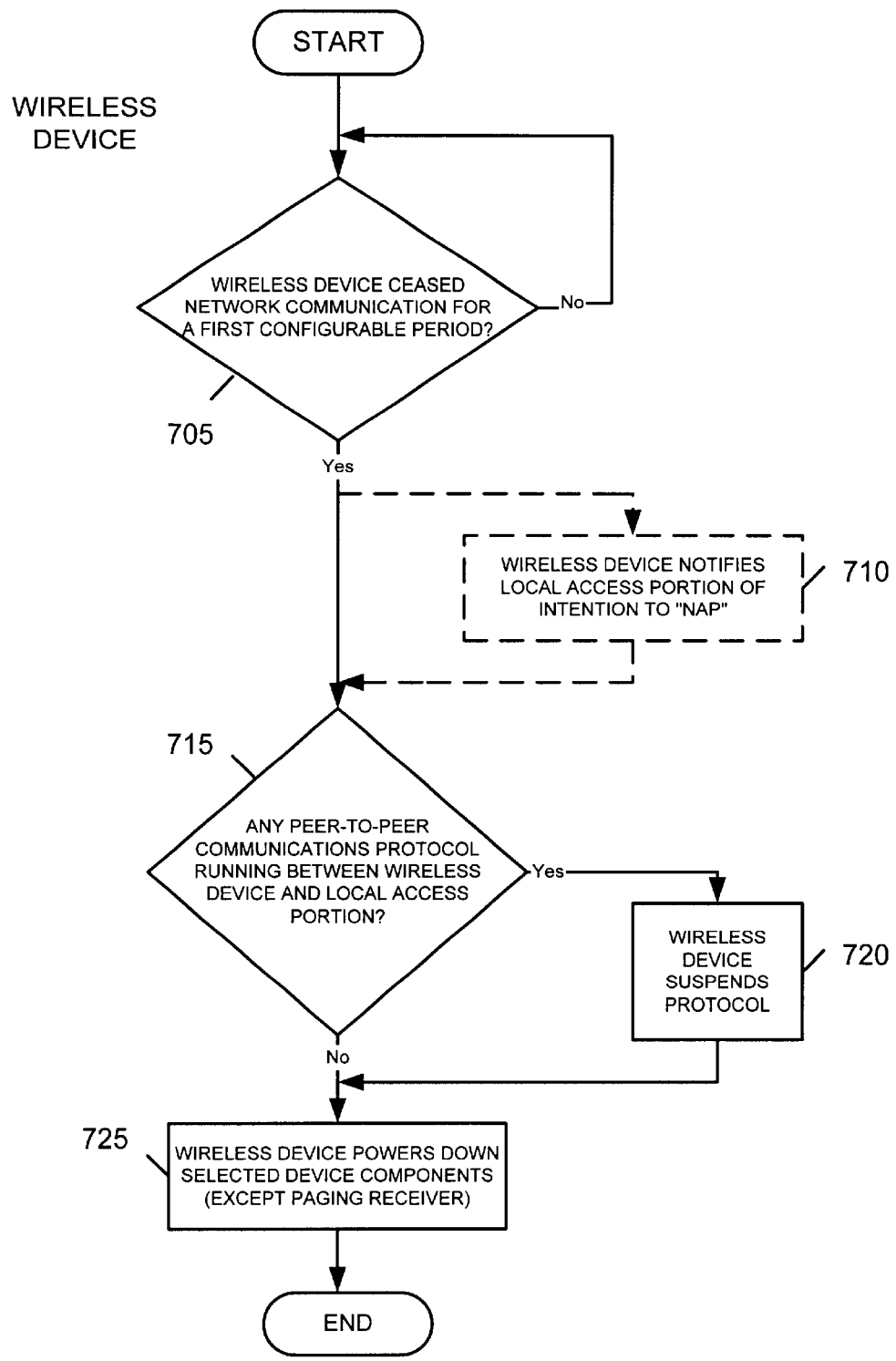
FIG. 7 illustrates exemplary system processing for placing the system into a "nap" state consistent with the present invention.

FIG. 7 is a flowchart of exemplary system processing for placing device 400 into a "nap" state (510) from an active communications state (505). [For purposes of providing a specific example in the following flowcharts, assume that device 400 has been actively communicating (505) and has secured an IP network address W.X.Y.Z and a subnet-level physical address SUB$_{ADDR}$1 from ARP server 125.] If device 400 ceases thereafter communicating with network 115 for a first configurable period of time, device 400 may enter a "nap" state (510) from the active communications state (505) to conserve energy. The first time period may be preset by the device 400 manufacturer or dynamically set by the system 100.

Before entering the "nap" state (510), device 400 first determines whether it has ceased communication with network 115 for the first configurable time period [step 705]. To make this determination, device 400 may maintain a timer that it resets upon each communication by the device 400. If device 400 has ceased communication with network 115 for the first configurable time period, the device 400 may optionally notify local access portion 110 of the device's intention to "nap" [step 710]. In this case, the device 400 may send a "nap" signal that identifies device 400 to the local access portion 110. The local access portion 110 may record the "nap" signal to maintain a record of the status of devices with which it communicates.

Device 400 further determines if any peer-to-peer communications protocol is running between device 400 and local access portion 110 [step 715]. To do this, the device 400 may check its memory to determine if any peer-to-peer primitives are present in recently buffered data. If so, device 400 suspends the protocols [step 720] and stores the peer-to-peer primitives. If not, device 400 powers down one or more device components, with the exception of paging receiver 415 [step 725]. For example, device 400 may power down data transceiver 410 and/or processing unit 430.

The exemplary system processing illustrated in FIG. 7 thus enables a wireless data communications device to conserve energy by powering down selected device components when the device does not maintain active data communications over a prolonged period of time.

Exemplary "Wake From Nap" System Processing

Figure 8:
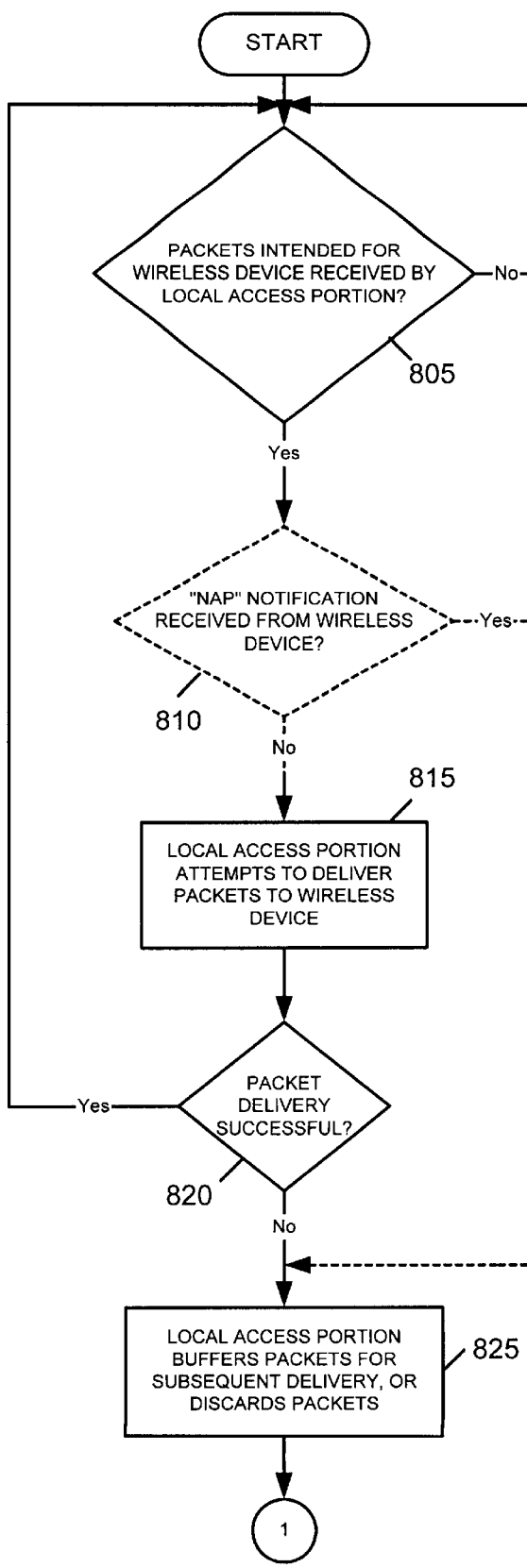
FIGS. 8–10 illustrate exemplary system processing for placing the system into a "wake from nap" state consistent with the present invention.
Figure 9:
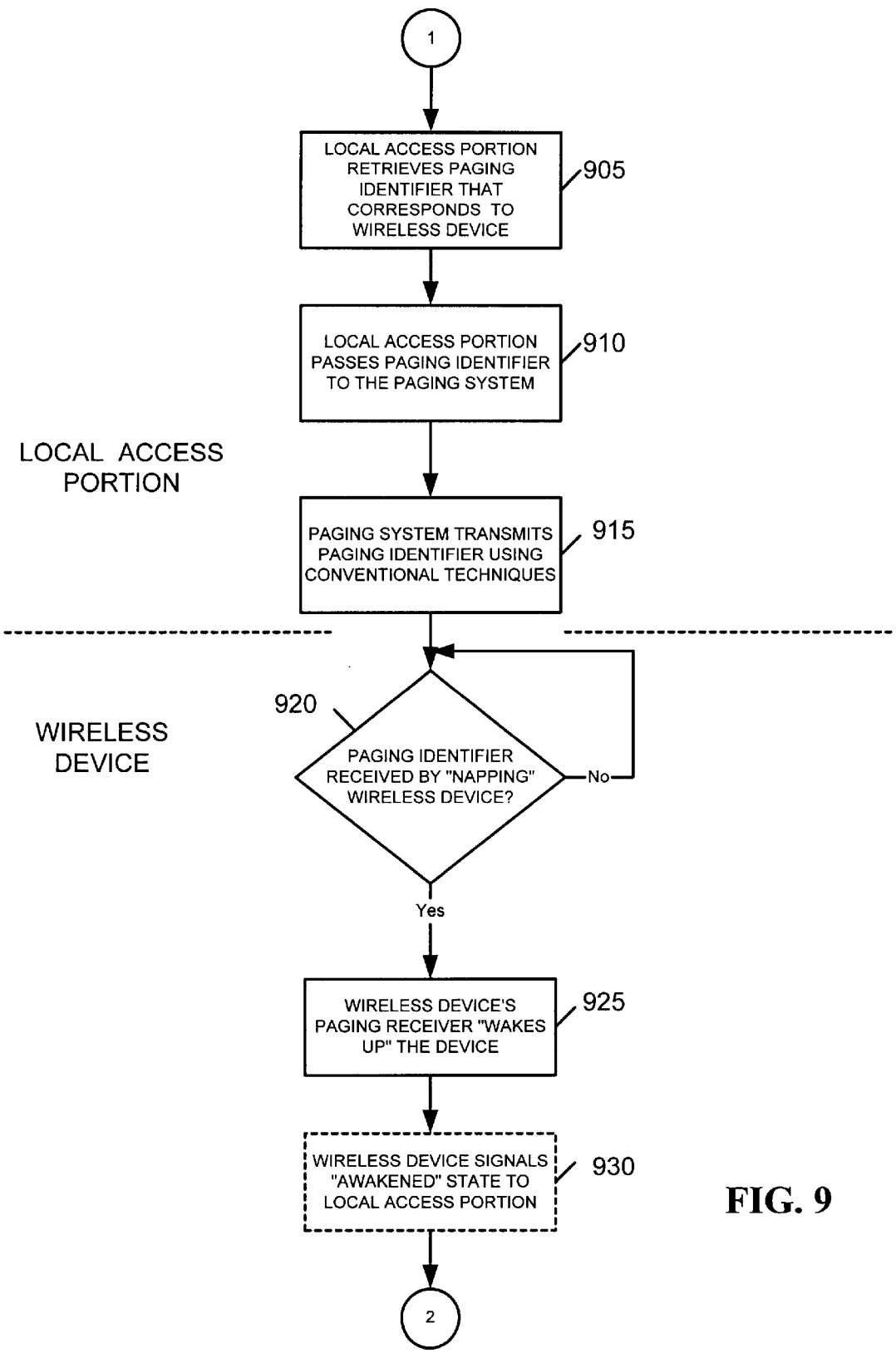
Figure 10:
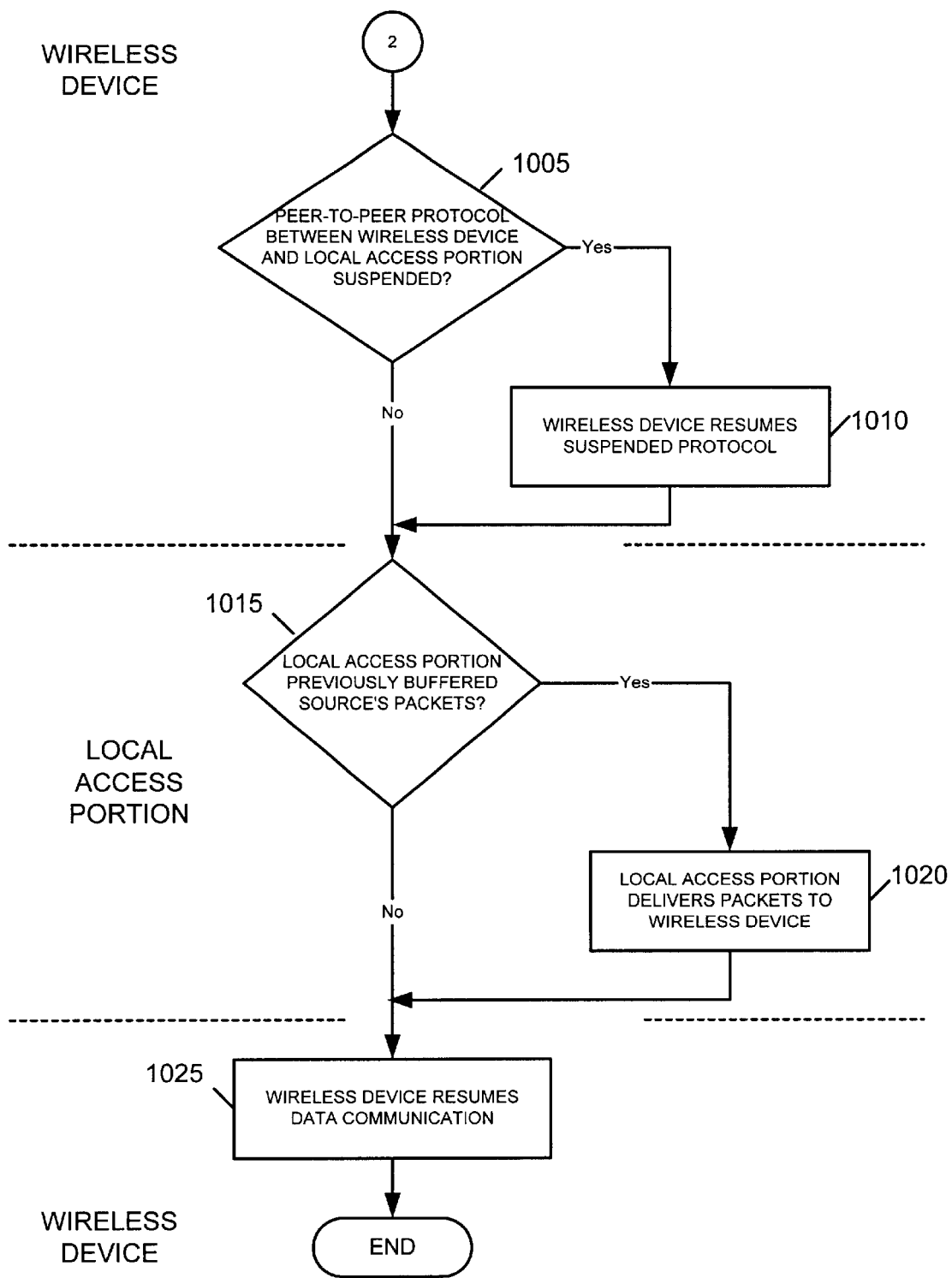

FIGS. 8–10 are flowcharts of exemplary system processing for placing device 400 into a "wake from nap" state (515) from a "nap" state (510). After device 400 enters a "nap" state (510), local access portion 110 determines whether it has received any packets intended for device 400 [step 805] (FIG. 8). The local access portion 110 may buffer packets prior to sending them to their intended destination.

If packets intended for device 400 have been received, local access portion 110 determines if a "nap" signal has previously been received from device 400 [step 810]. To make this determination, local access portion 110 may simply check its records of received "nap" signals. If a "nap" notification has previously been received, local access portion 110 may buffer the packets for subsequent delivery, or may discard the packets [step 825].

If no "nap" signal was received, local access portion 110 attempts to deliver the packets to device 400 [step 815]. Local access portion 110 may do this by forwarding the messages to the cellular network portion 105 for transmission to the device 400 and determining if delivery of the packets to device 400 was successful [step 820]. To make this determination, the local access portion 110 may use a link-level protocol implementing Automatic Repeat Request (ARQ). In this case, device 400 may return an Acknowledgment message to local access portion 110 upon successful receipt of the packets. If packet delivery was successful, local access portion 110 resumes processing at step 805 and awaits further packets intended for the device 400. If packet delivery was not successful, local access portion 110 may buffer the packets for subsequent delivery, or may discard the packets entirely [step 825].

After buffering packets intended for device 400, local access portion 10 may retrieve the paging identifier (PI) 320 that corresponds to device 400 [step 905] (FIG. 9). The local access portion 110 may retrieve the PI 320 by sending a request, containing host name 305, to the network address server 120 via network 115. In response to the request, the network address server 120 may retrieve the PI 320 from its database 220 using host name 305 as an index.

Local access portion 110 then may pass PI 320 to paging controller 630 [step 910]. For example, the paging controller 630 may connect to local access portion 110 via a network, such as network 115. In this case, the local access portion may send a message the includes the PI 320 to paging controller 630, via the network 115, to instruct the paging controller 630 to send a page, using PI 320, to device 400. Using conventional paging techniques, paging controller 630 forwards PI 320 on to paging antenna 640. Paging antenna 640 may then transmit a paging signal, including PI 320, to device 400 [step 915].

Paging receiver 415 of device 400, which remains powered up during the "nap" state (510), receives the paging signal, including PI 320, from the paging antenna 640 [step 920]. In response to the paging signal, device 400 powers up the components of device 400 that were previously powered down [step 925]. For example, if data transceiver 410 and processing unit 430 were previously powered down, these components are brought to a powered up status.

Device 400 then may optionally signal its "awakened" state to local access portion 410 [step 930]. Device 400 may, for example, send an "awake" signal that identifies device 400 to the local access portion 110. The local access portion 110 may record the "awake" signal to update its record of the status of devices with which it communicates.

Device 400 may next determine if any peer-to-peer protocol(s) between local access portion 110 and device 400 were previously suspended [step 1005] (FIG. 10). To do this, device 400 determines if peer-to-peer primitives were previously stored in memory. If peer-to-peer protocols have been suspended, device 400 retrieves the previously stored primitives and resumes the suspended protocol(s) [step 1010].

Local access portion 110 then determines if packets intended for device 400 were previously buffered [step 1015]. If packets were buffered, local access portion 110 delivers these packets to device 400 [step 1020]. Device 400 may then resume network data communication [step 1025].

The exemplary system processing illustrated in FIGS. 8–10 thus enables device 400 to power up components of a "napping" wireless data communications device when packets, intended for the device, are received at local access portion 110 of network 115. During the "nap" state, network address server 120 and ARP server 125 may maintain device 400's previously determined network and subnet level addresses, respectively (e.g., IP address W.X.Y.Z. and subnet-level address $SUB_{ADDR}1$).

Exemplary "Sleep" System Processing

Figure 11:
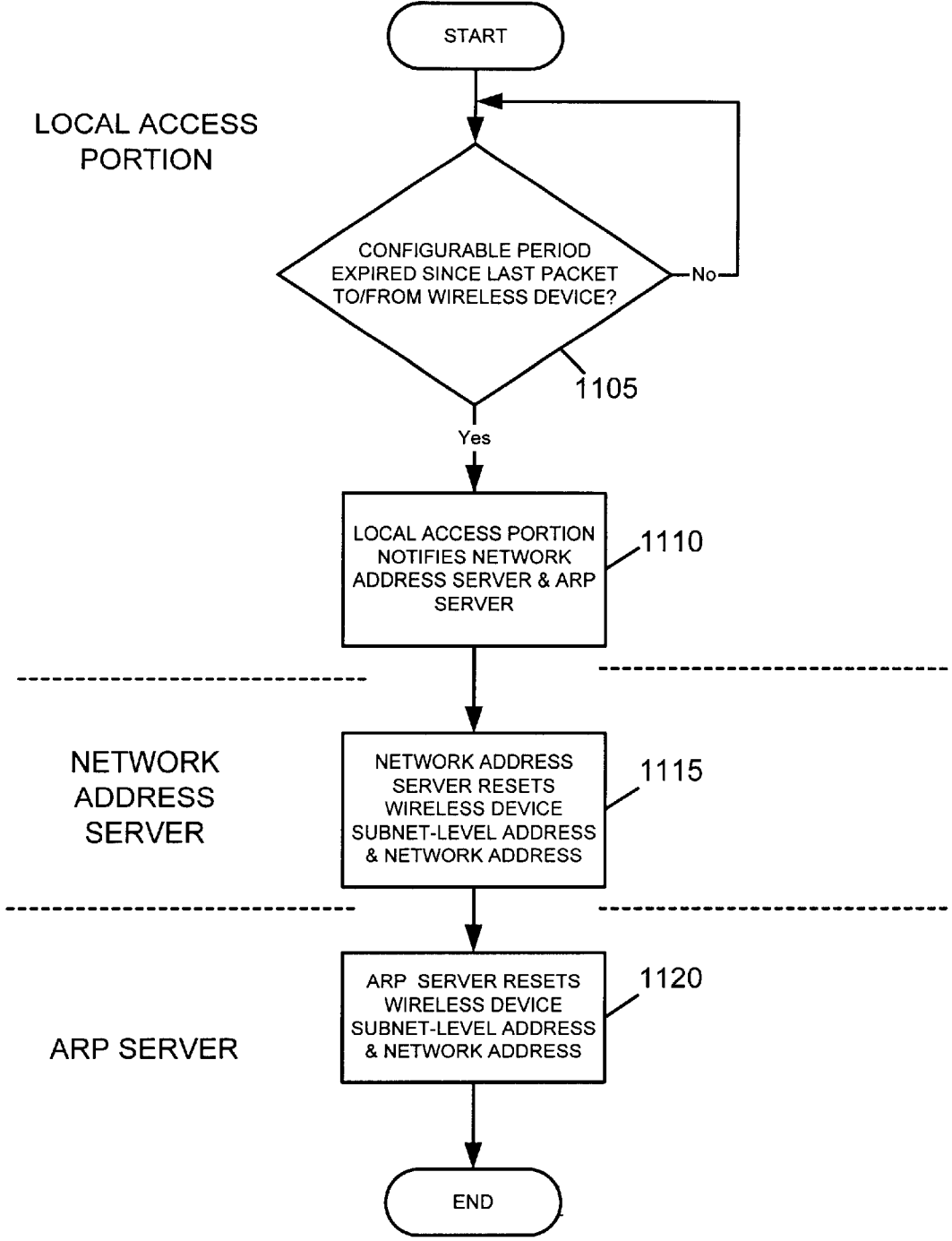
FIG. 11 illustrates exemplary system processing for placing the system into a "sleep" state from a "nap" state consistent with the present invention.

FIG. 11 is a flowchart of exemplary system processing for placing device 400 into a "sleep" state (520) from a "nap" state (510). Local access portion 110 first determines if a second configurable time period has expired since a last packet was transmitted to or received from device 400 [step 1105]. The second configurable time period may be preset by the device 400 manufacturer or dynamically set by the system 100. If the time period has expired, local access portion 110 notifies network address server 120 and ARP server 125 [step 1110]. In this case, local access portion 100 may send a "reset address" signal that identifies device 400 (e.g., by host name) and indicates that network address server 120 and ARP server 125 should reset the addresses associated with device 400. In response to the notification, network address server 120 may reset the network address (IP address W.X.Y.Z) and subnet-level address ($SUB_{ADDR}1$) values of device 400 by setting their values, contained in record 300, to null values [step 1115]. Likewise, ARP server 125 may set the network and subnet-level addresses of device 400 to null values [step 1120].

The exemplary system processing illustrated in FIG. 11 thus enables device 400 to relinquish its associated network and subnet-level addresses. Future data communication with device 400 will therefore necessitate the determination of new network and subnet-level addresses associated with the then current location of device 400.

Exemplary "Wake From Sleep" System Processing"

Figure 12:
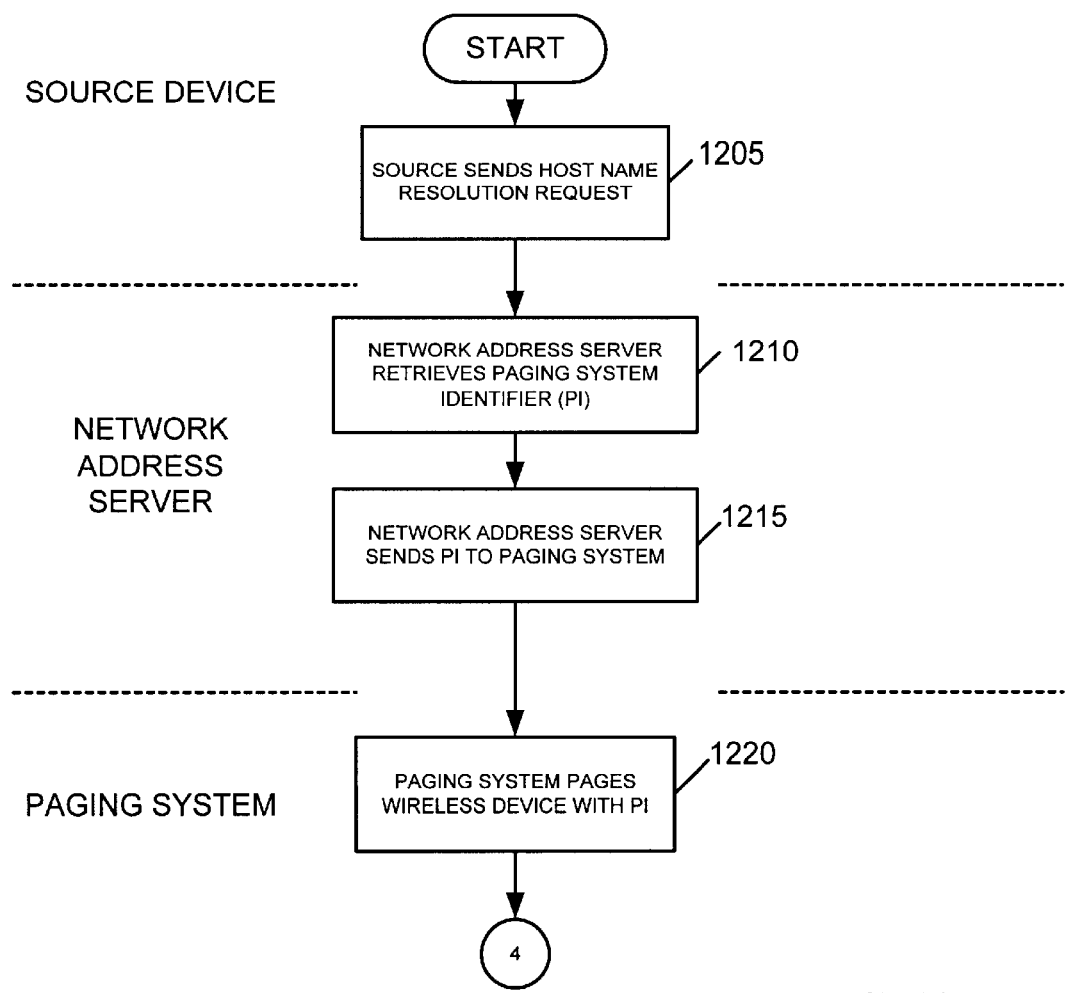
FIGS. 12–15 illustrate exemplary system processing for placing the system into a "wake from sleep" state from a "sleep" state consistent with the present invention.
Figure 13:
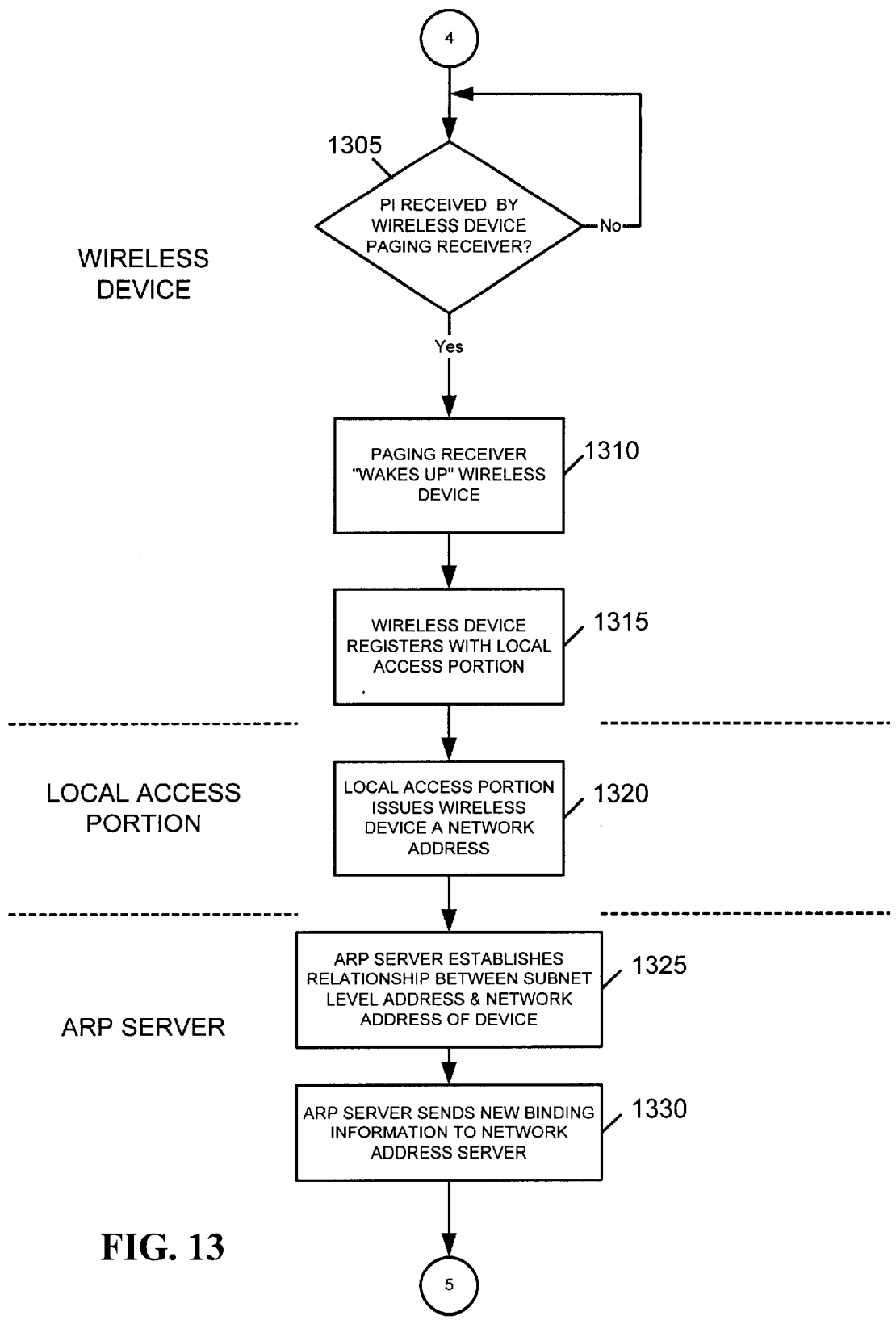
Figure 14:
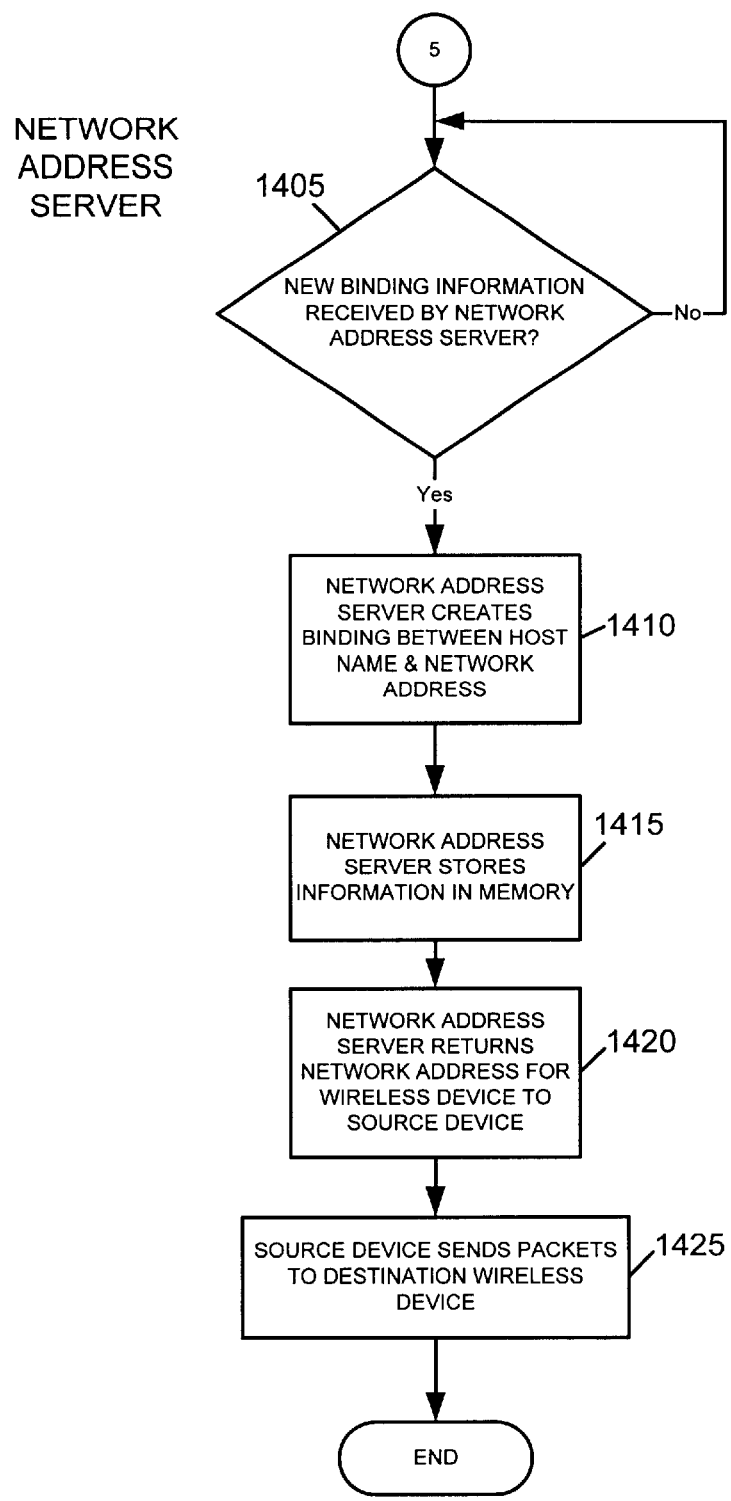

FIGS. 12–14 are flowcharts of exemplary system processing for placing device 400 into a "wake from sleep" state (525) from a "sleep" state (520), in the case where a data source attempts to send data to device 400. For device 400 to be in a "sleep" state, device 400 must have ceased data communication for the second configurable period of time such that network resources, including its network address (e.g., IP address W.X.Y.Z) and subnet-level address ($SUB_{ADDR}1$), were relinquished (e.g., set to null). Therefore, any source device that desires to send data to device 400 must first secure new network and subnet-level addresses for the device.

To contact device 400, the source device may send a host name resolution request (e.g., domain name resolution request) to network address server 120 to convert device 400's host name into a network address [step 1205] (FIG. 12). In response to receipt of the request, network address server 120 retrieves a paging identifier (PI) 320, associated with the destination device 400, from database 220 [step 1210] using the host name as an index. Network address server 120 then passes PI 320 to paging controller 630 [step 1215]. Using conventional paging techniques, paging controller 630 forwards PI 320 on to paging antenna 640. Paging antenna 640 may then transmit a paging signal, including PI 320, to device 400 [step 1220].

Device 400 receives the paging signal, including PI 320, from the paging antenna 640 [step 1305]. In response to receipt of the paging signal, device 400 "wakes up" by powering up components of the device that were previously powered down [step 1310]. For example, if data transceiver 410 and processing unit 430 were previously powered down, these components are brought to a powered up status. After powering up, device 400 registers with local access portion 110 using conventional techniques [step 1315]. In response to registration, local access portion 110 issues a new network address to device 400, using conventional mechanisms, to enable device 400 to communicate with network 115 [step 1320]. For example, the issued network address could include a new IP address M.N.O.P.

After issuance of a network address to device 400, ARP server 125 binds the issued network address to the new subnet-level address of device 400 [step 1325]. For example, IP address M.N.O.P can be bound to new subnet-level address $SUB\_{ADDR}2$. ARP server 125 then sends this new binding information to network address server 120 [step 1330].

Network address server 120 receives the new binding information [step 1405] (FIG. 14) and creates a binding between the device's issued network address (IP address M.N.O.P) and the device's host name [step 1410]. Network address server 120 binds the network address and host name by associating and storing the two in a single record 300 in database 220 [step 1415]. Network address server 120 then returns the new network address for device 400 to the source device [1420]. After receipt of the network address, the source device may begin sending packets to the destination wireless device 400 [1425].

Figure 15:
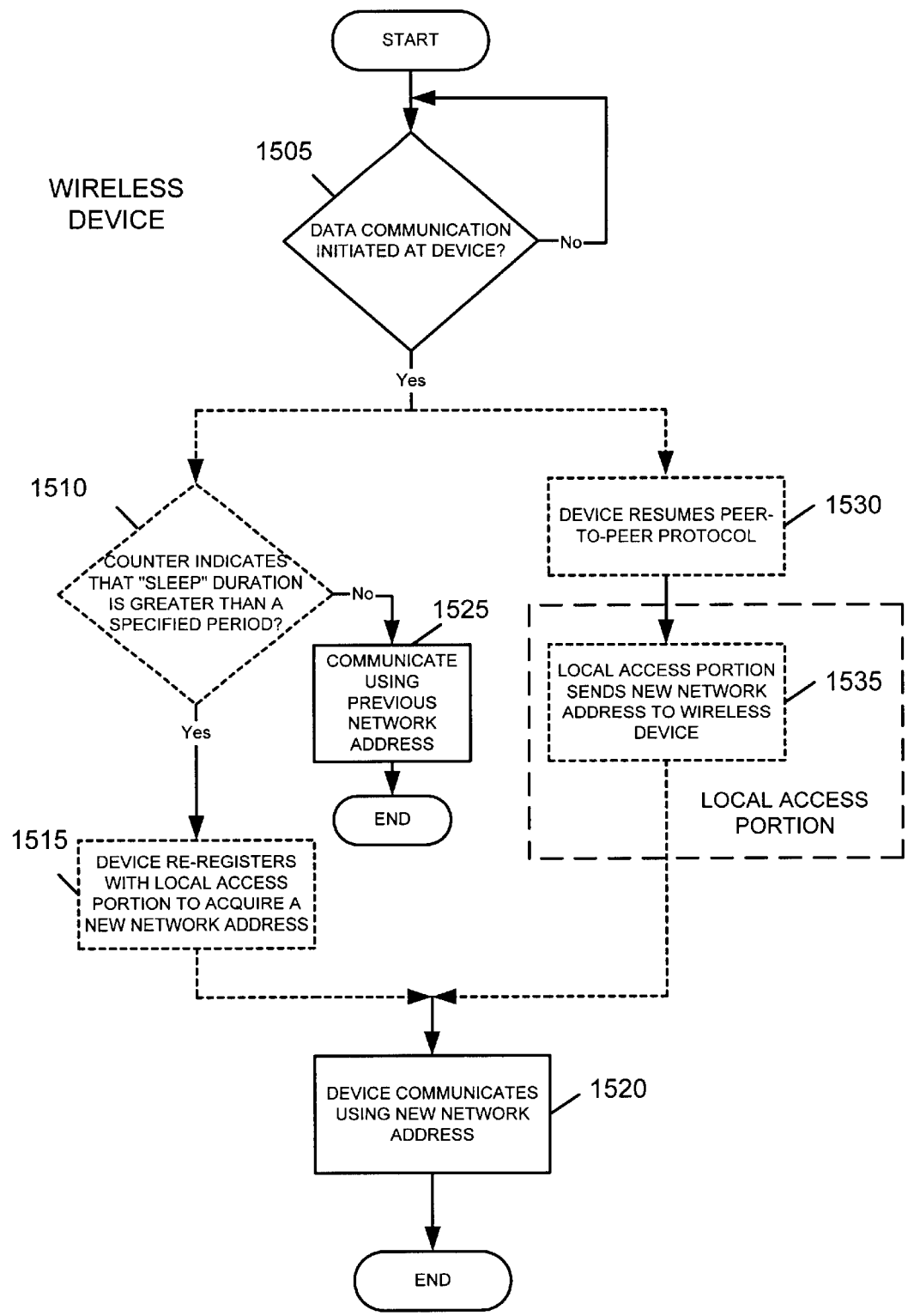

FIG. 15 illustrates exemplary system processing for placing device 400 into a "wake from sleep" state (525) from a "sleep" state (520) in the case where device 400, itself, attempts to re-establish communication with network 115 [step 1505]. Two optional methods can be implemented to enable device to re-establish communication with network 115. In a first optional method, device 400 determines if the contents of an internal counter indicate that the device's "sleep" duration has been greater then a specified period [step 1510]. The specified period may by preset by the device 400 manufacturer or dynamically set by the system 100. If so, device 400 re-registers, using conventional techniques, with local access portion 110 to acquire a new network address and subnet-level address (e.g., IP address M.N.O.P. and $SUB\_{ADDR}2$) [step 1515]. Device 400 then may transmit data using the newly acquired network address [step 1520]. If device 400's "sleep" duration has been less than the specified period, the device communicates using a previous network address (e.g., W.X.Y.Z) [step 1525].

In a second optional method, device 400 immediately resumes a peer-to-peer protocol with local access portion 110 [step 1530]. To do this, device 400 retrieves previously stored primitives and resumes the suspended protocol(s) [step 1010]. In response to resumption of the protocol, local access portion 110 sends a new network address to device 400 [step 1535]. Device 400 then may communicate using the newly acquired network address [step 1520].

The exemplary system processing illustrated in FIGS. 12–15 thus enables system 200 to power up components of device 400 and determine the network and subnet-level addresses associated with the current position of device 400.

Conclusion

Systems and methods consistent with the present invention provide mechanisms that improve energy conservation in wireless data communications devices. These mechanisms a permit selective powering down of inactive wireless data communications devices for purposes of conserving energy, while enabling the devices to power back up when necessary to receive or transmit data. Mechanisms consistent with the present invention therefore permit a wireless data communications device to go into "nap" or "sleep" states, in which energy to selected device sub-components is turned off, as a function of the device's data communication activity.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the following claims and their equivalents.

What is claimed is:

1. A method of conserving energy in a wireless device, comprising:

determining whether the device has ceased communication for a period of time;

selectively powering down components in the device when the device has ceased communication for the period of time;

receiving a paging message from a first communications network;

powering up the components in the device in response to receipt of the paging message;

registering, in response to receipt of the paging message, with a second communications network to receive a new network address; and communicating, using the network address, via the second communications network, and not via the first communications network, in response to receipt of the paging message.

2. The method of claim 1, further comprising:

notifying the second communications network of the device's intention to power down the components.

3. The method of claim 1, further comprising:

determining if any peer-to-peer communication protocol is running between the device and the second communications network.

4. The method of claim 3, further comprising:

suspending the protocol when the device has ceased communication for the period of time.

5. A method of powering up components in a wireless device, comprising:

receiving a paging message at the device from a paging network, the device having components in a powered down state and the paging message instructing the device to power up components of the device;

powering up the components in response to the paging message;

registering, in response to receipt of the paging message, with another communications network to receive a new network address; and communicating, using the network address, via the other communications network, and not via the paging network, in response to receipt of the paging message.

6. The method of claim 5, further comprising:

determining if any peer-to-peer communication protocol between the device and the other communications network was previously suspended.

7. The method of claim 6, further comprising:

resuming the protocol if the protocol was previously suspended.

8. The method of claim 7, further comprising:

receiving data from the other communications network.

9. A computer-readable medium containing instructions for controlling at least one processor to perform a method that powers up components in a wireless device, the method comprising:

receiving a paging message at the device from a paging network, the device having components in a powered down state and the paging message instructing the device to power up components of the device;

powering up the components of the device in response to the paging message;

registering, in response to receipt of the paging message, with another communications network to receive a new network address; and communicating, using the network address, via the other communications network, and not via the paging network, in response to receipt of the paging message.

10. The method of claim 9, further comprising:

determining if any peer-to-peer communication protocol between the device and the other communications network was previously suspended.

11. The method of claim 10, further comprising:

resuming the protocol if the protocol was previously suspended.

12. The method of claim 11, further comprising:

receiving data from the other communications network.

13. A system for conserving energy in a wireless device comprising:

means for determining whether the wireless device has ceased communication for a period of time;

means for selectively powering down components in the device based on the determination;

means for receiving a paging message from a first communications network;

means for powering up the components in the device in response to receipt of the paging message;

means for registering, in response to receipt of the paging message, with a second communications network to receive a new network address; and means for communicating, using the network address, via a second communications network, and not via the first communications network, in response to receipt of the paging message.

14. A wireless device comprising:

at least one transceiver; and a processor configured to:

determine if the device has ceased communicating for a time period, instruct selected components of the device to power down when the device has ceased communicating for the time period, receive a paging message from a first communications network, power up components of the device in response to receipt of the paging message, register, in response to receipt of the paging message, with a second communications network to receive a new network address; and communicate, using the network address, via the second communications network, and not via the first communications network, in response to receipt of the paging message.

15. A computer-readable medium containing instructions for controlling at least one processor to perform a method of conserving energy in a wireless device, comprising:

determining if the device has ceased communicating for a time period;

instructing selected components of the device to power down when the device has ceased communicating for the time period;

receiving a paging message from a first communications network;

powering up components of the device in response to receipt of the paging message;

registering, in response to receipt of the paging message, with a second communications network to receive a new network address; and communicating, using the network address, via the second communications network, and not via the first communications network, in response to receipt of the paging message.

* * * * *

UNITED STATES PATENT AND TRADEMARK OFFICE
CERTIFICATE OF CORRECTION

PATENT NO. : 6,859,135 B1  Page 1 of 1
APPLICATION NO. : 09/586876
DATED : February 22, 2005
INVENTOR(S) : Brig Barnum Elliott It is certified that error appears in the above-identified patent and that said Letters Patent is hereby corrected as shown below:

Title Page, column 1, line 1, below "4,398,192 A", insert
-- 5,153,903 * 10/1992 Eastmond et al. 455/458
   5,175,758 * 12/1992 Levanto et al. 455/458 --.

Title Page, column 2, line 4, below "5,710,975 A", insert
-- 5,722,084 * 2/1998 Chakrin et al. 455/551 --.

Title Page, column 2, line 6, below "5,778,309 A", insert
-- 5,802,470 * 9/1998 Gaulke et al. 455/426.1 --.

Signed and Sealed this

Ninth Day of June, 2009

JOHN DOLL
*Acting Director of the United States Patent and Trademark Office*